Figure 1:
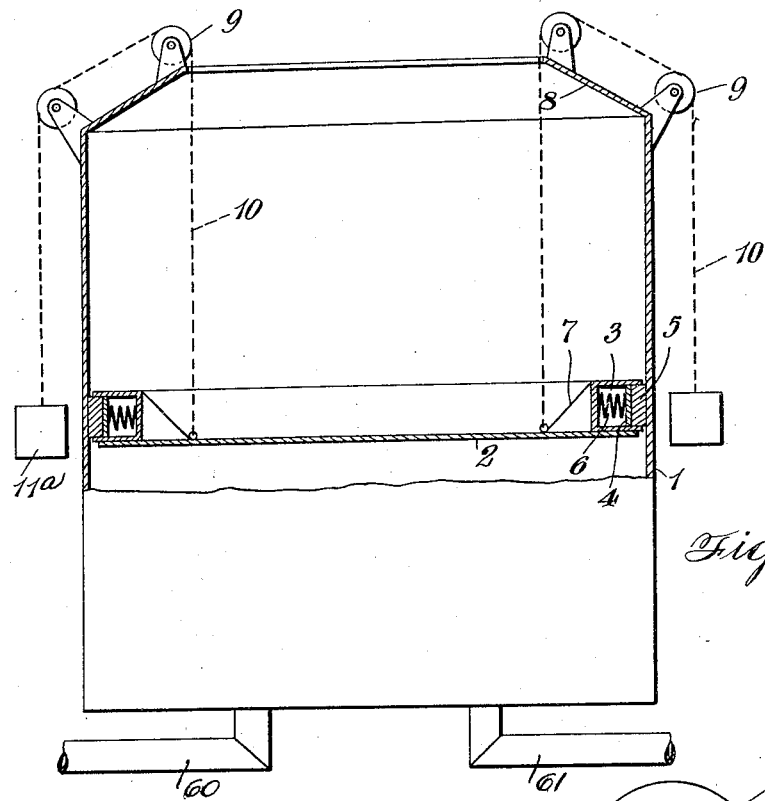

Sept. 13, 1932.     R. R. WAGNER     1,876,805
SOLID SEALING COMPOSITION FOR WATERLESS GASHOLDERS
Filed April 9, 1928

Inventor:
Reinhold Richard Wagner by Karl Leichauer
Atty.

Patented Sept. 13, 1932

1,876,805

UNITED STATES PATENT OFFICE

REINHOLD RICHARD WAGNER, OF BERLIN-CHARLOTTENBURG, GERMANY

SOLID SEALING COMPOSITION FOR WATERLESS GASHOLDERS

Application filed April 9, 1928, Serial No. 268,586, and in Germany April 13, 1927.

My invention relates to gas holders of the waterless type, comprising an axially movable piston-like member or closure slidable along the inner surface of the gas-holder casing or shell and constituting, together with this shell, a gas chamber of variable volume.

It is an object of my invention to provide a simple and reliable gastight seal or packing between the piston-like member or closure and the wall of the gasholder.

The seal according to my invention consists of a composition containing soap and mineral oil, which, while being plastic to a certain extent, behaves like a solid body within the range of operating temperatures and pressures occurring in a gasholder, propagating pressure exerted upon its surface substantially in the direction of the pressure, in contradistinction to the liquid or semi-liquid sealing means hitherto in use, which give way slowly, but incessantly under operating pressures.

I am aware that solid substances such as rubber and the like have already been suggested as packing means in gasholders. However, these solid means have been found to be unsatisfactory for various reasons. Liquid seals, on the other hand, are not reliable in operation and therefore require permanent supervision and refilling to replace the sealing liquid lost through leakage.

It has also been suggested to provide a packing composition containing metal oxides and oils. However, this composition has all the characteristics of putty, becoming hard in the course of time and being unsuitable for use in gasholders, in which the sealing composition is expected to remain operative for years without undergoing any change as to its constitution and chemical properties.

The composition forming part of the present invention is neither a solid nor a liquid or semi-liquid, but it is closely related to a solid in view of its behavior under pressure above referred to, and it is not subject to hardening.

Its constitution may vary within certain limits. It should contain more than 15% hard soap (soda soap) and less than 85% highly viscous and highly inflammable mineral oil residues, the flash point of which is above 300° C.

The preparation of a composition of this kind may be illustrated by the following recipes, the constituents of which are heated to effect saponification as usual:

| | Mixture 1 | Mixture 2 | Mixture 3 | Mixture 4 |
|---|---|---|---|---|
| Rape-seed oil | | 15 | | 10 |
| Rape-seed oil (oxidized) | 10 | | 8 | |
| Castor-oil | 10 | | 8 | 15 |
| Oleine | | 15 | | |
| Tallow | | | 8 | |
| Solution of caustic soda, 30 Bé | 10 | | | |
| Solution of caustic soda, 36 Bé | | 15 | 12 | 12 |
| Refined mineral oil | 70 | 55 | 64 | 63 |
| Melting point of saponified mixture | 170° C. | 170° C. | 185° C. | 150° C. |

The bricks formed from a composition obtained by saponification of one of these mixtures are substantially solid and rigid to the extent that they can be mounted in an open annular channel surrounding the piston-like member or closure of the gasholder, the bricks being in direct sliding contact with the inner wall of the gasholder casing. Their inner or rear faces may be acted upon by pressure exerting means such as weights pressing them against the gasholder wall without causing any appreciable deformation of the composition even under pressure such as are required with rubber and other like packings.

In the drawing affixed to this specification and forming part thereof a gasholder embodying my invention is illustrated diagrammatically by way of example.

In the drawing

Figure 2:
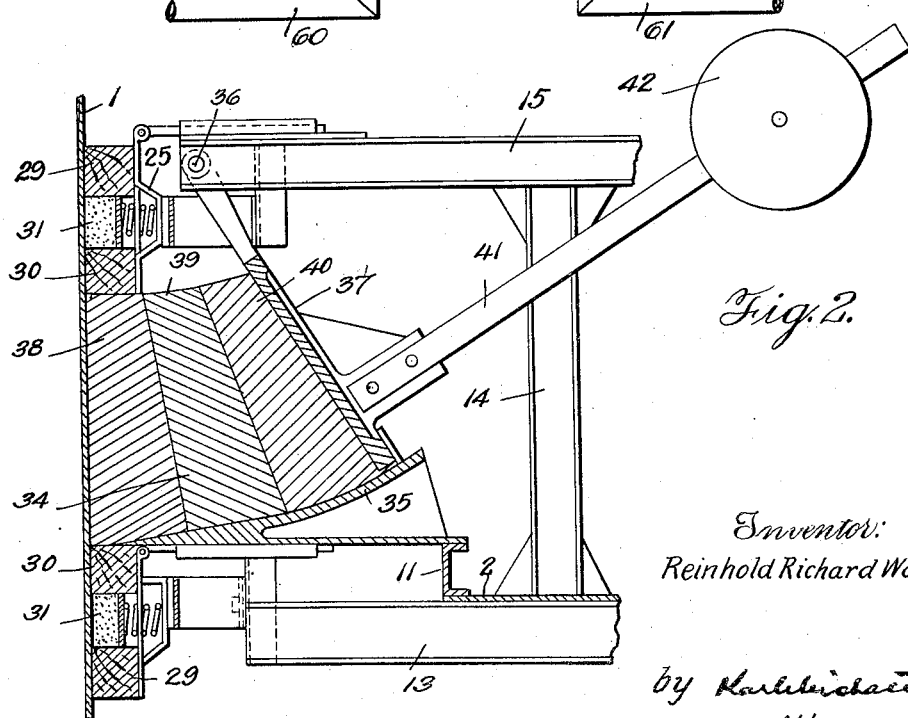

Fig. 1 is an elevation of the gasholder, partly in section, showing the simplest form of a packing according to this invention, while Fig. 2 is a vertical section, drawn to a larger scale, of a packing in which pressure is exerted on the bricks by a plate loaded with an adjustable weight.

Referring to the drawing and more particularly to Fig. 1, 1 is the shell or casing of the holder, 60, 61 are the inlet and outlet pipes for the gas and 2 is the piston-like member or closure which is axially slidable in the holder. 3 is an annular channel extending along the perimeter of the closure, 4 is one of a number of spacing plates inserted in the channel and 5 is one of the bricks of sealing composition inserted between the spacing plates and the wall of the holder. 6 is a spring exerting pressure on the spacing plate 4, 7 is a brace absorbing the reaction of the spring pressure, 8′ is a tapering flange provided at the top of the holder, to replace the usual top plate, this flange preventing direct access of rain or other liquid to the seal. 9, 9 are sheaves on the top of the holder, 10 are cables extending around the sheaves and secured to the piston-like member 2, and 11a are counterweights at the ends of the cables. The wall of the holder is smooth on the inside as is usual in holders of this type.

The gap between the circumferential edge of the channel 3 and the inner wall of the holder is very small, being for instance $\frac{1}{16}$ in. or thereabouts. The space confined between the flanges of the channel 3 and the spacing plate is completely filled by the composition 5 which is rigid enough to exert, without being deformed or extruded, the pressure required for sealing the gap, this pressure being a function of the gas pressure and of the height of the body of sealing composition.

In Fig. 2 the piston-like member 2 is equipped with a framework 13, 14, 15 formed of channel sections, the section 11 surrounding the edge of the member 2. Secured on the channel section 11 is an annular support 35, which has a wedge-like cross section with a curved upper surface. 36 are pivots in the upper girder 15 which are centrically arranged with respect to the curvature of the support 35. 37 are flaps mounted for oscillation about the pivots 36, their bottom edges moving in contact with the curved wall of the annular support 35. 38, 39, 40 are sector-shaped blocks of my solid sealing composition, the rear face of the rearmost block being inclined and acted upon by the flap 37 so that the outermost block 38 is held applied against the inner wall of the shell of the holder. On the outer blocks 38 are resting wooden blocks 30 arranged in the top bracket 25 which prevent their sticking to the wall of the casing when the member 2 descends, while, when it rises, the outer blocks are retained by the outer edge of the support 35 and by the blocks 30 arranged below them.

In order to increase the pressure acting on the sealing blocks I provide a weighted lever 41 acting on each flap 37, this lever carrying an adjustable weight 42.

The sealing composition constituting the blocks 5 and 38, 39, 40, respectively, adheres to the inner wall of the gasholder casing to the extent that a comparatively thin layer of this composition will stand up against normal gas pressures. The height of the annular channel 3 may be small in proportion. As the sealing composition has no tendency to flow, there is no necessity to take particular care to assure an exact horizontal position of the piston-like member 2 within the gasholder and consequently no particular means are required for maintaining the exact horizontal position of member 2.

As the new composition does not become rancid nor is otherwise influenced by the chemical action of the gas in the holder, nor by air, sunshine etc., the middle part of the roof usually provided in vertical holders of this type may be dispensed with, whereby not only the initial cost is reduced, but also the possibility is eliminated of explosive mixtures forming above the piston-like member 2 due to leakage of gas through the packing.

I wish it to be understood that I do not desire to be limited to the exact details of construction shown and described for obvious modifications will occur to a person skilled in the art.

I claim:—

In a gasholder of the waterless type comprising a shell, a piston-like closure movable axially in said shell, and means interposed between said piston-like closure and the inner wall of said shell for the purpose of exerting a pressure on a solid sealing composition, the process of providing said piston-like closure with a solid sealing composition composed of an emulsion of soap and mineral oil.

In testimony whereof I affix my signature.

REINHOLD RICHARD WAGNER.